(12) United States Patent
Dehne

(10) Patent No.: US 7,350,613 B2
(45) Date of Patent: Apr. 1, 2008

(54) TRANSPORT WITH ROTATABLE LOAD AND SAFETY BUMPER

(75) Inventor: Noel F. Dehne, Novi, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 391 days.

(21) Appl. No.: 11/089,656

(22) Filed: Mar. 25, 2005

(65) Prior Publication Data

US 2005/0232729 A1 Oct. 20, 2005

Related U.S. Application Data

(60) Provisional application No. 60/558,206, filed on Mar. 31, 2004.

(51) Int. Cl.
B62D 1/00 (2006.01)

(52) U.S. Cl. ........................ 180/167; 180/168; 180/169; 701/22; 701/23

(58) Field of Classification Search ................ 180/167, 180/168, 169; 701/22, 23
See application file for complete search history.

(56) References Cited

U.S. PATENT DOCUMENTS

| 3,177,740 | A | * | 4/1965 | Firestone et al. ............ 74/826 |
| 4,437,533 | A | | 3/1984 | Bierkarre et al. |
| 4,530,056 | A | | 7/1985 | MacKinnon et al. |
| 4,566,032 | A | | 1/1986 | Hirooka et al. |
| 4,802,096 | A | | 1/1989 | Hainsworth et al. |
| 4,817,750 | A | | 4/1989 | Ishida et al. |
| 4,945,622 | A | * | 8/1990 | Kaibuki et al. ............. 29/281.1 |
| 5,244,055 | A | | 9/1993 | Shimizu |
| 5,434,781 | A | | 7/1995 | Alofs et al. |
| 5,467,084 | A | | 11/1995 | Alofs et al. |
| 5,617,023 | A | | 4/1997 | Skalski |
| 5,825,481 | A | | 10/1998 | Alofs et al. |
| 5,881,832 | A | * | 3/1999 | Zitz et al. .................... 180/169 |
| 5,988,306 | A | * | 11/1999 | Ooishi ........................ 180/168 |
| 6,049,745 | A | | 4/2000 | Douglas et al. |
| 6,112,858 | A | * | 9/2000 | Arnst .......................... 187/269 |
| 6,272,406 | B2 | | 8/2001 | Alofs et al. |
| 6,446,743 | B2 | * | 9/2002 | Suzuki ........................ 180/168 |
| 6,481,521 | B2 | * | 11/2002 | Sugiyama et al. ........... 180/168 |
| 6,592,080 | B2 | * | 7/2003 | Murata et al. .............. 246/1 C |
| 6,857,493 | B2 | * | 2/2005 | Shupp et al. ................ 180/168 |
| 2005/0021196 | A1 | * | 1/2005 | Moriguchi .................... 701/23 |

FOREIGN PATENT DOCUMENTS

JP 11011318 1/1999

* cited by examiner

Primary Examiner—Christopher P. Ellis
Assistant Examiner—John D Walters
(74) Attorney, Agent, or Firm—Dickinson Wright PLLC

(57) ABSTRACT

A vehicle having (i) a rotatable platform for securing a load thereto, and (ii) an object detection system for detecting an object in the vehicle's path of travel. The sensitivity of the object detection system is variable so that it can be varied based on the rotated position of the load.

20 Claims, 4 Drawing Sheets

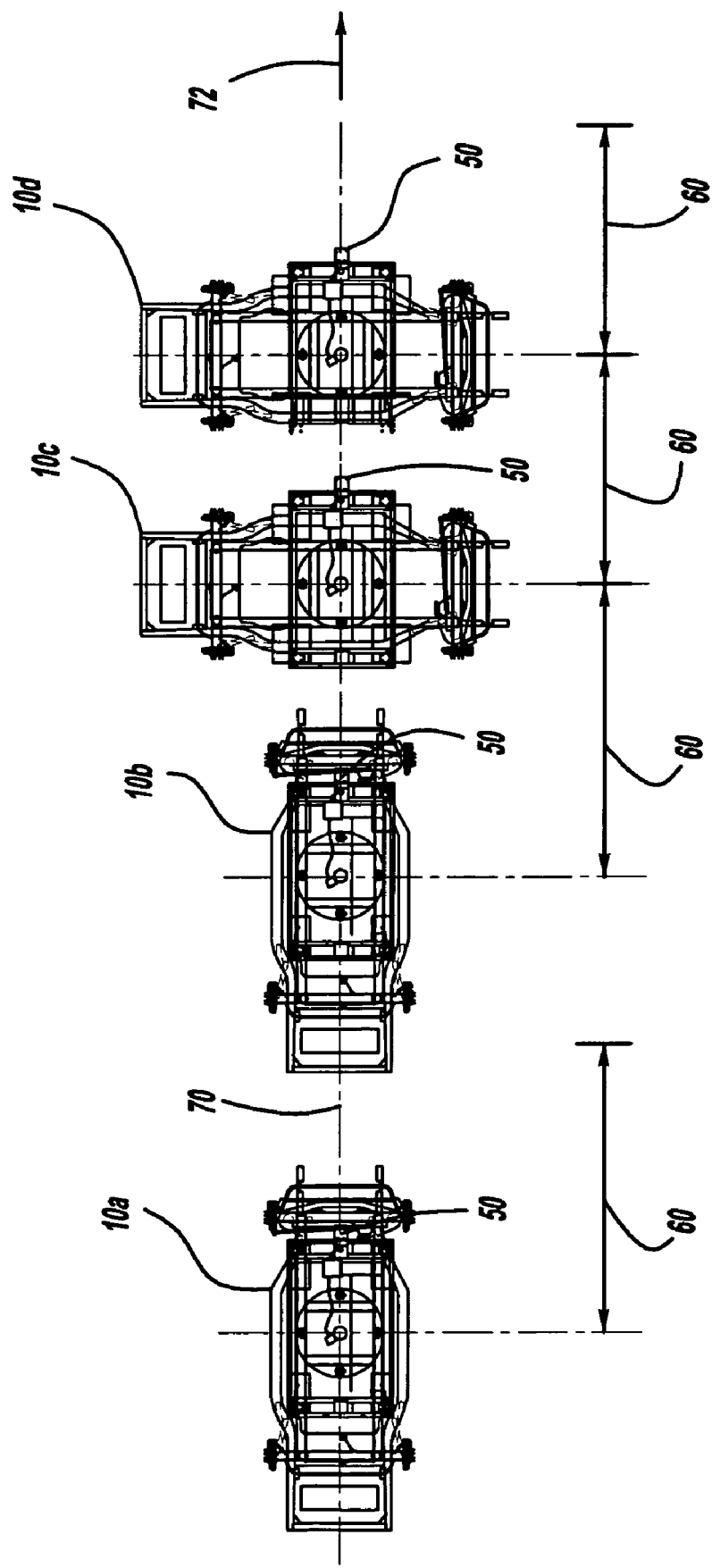

TRANSPORT WITH ROTATABLE LOAD AND SAFETY BUMPER

CROSS-REFERENCE TO RELATED APPLICATION

This application claims the benefit of U.S. Provisional Application No. 60/558,206, filed Mar. 31, 2004, the entire disclosure of the provisional application being considered part of the disclosure of this application and hereby incorporated by reference.

BACKGROUND OF THE INVENTION

The present invention is generally directed to material handling vehicles and, more particularly, to a vehicle having a rotatable platform upon which to secure a load and an adjustable safety bumper.

Automatic guided vehicles (AGVs) are used throughout the material handling industry to transport loads. The term AGV is commonly used to refer to robust vehicle designs having any of a number of available automated guidance systems. Automatic guided carts (AGCS) is a term commonly used to refer to a less robust vehicle used for similar but smaller-scale applications. Current AGC designs generally include a frame with swivel castors located at the four corners of the frame. Other features may include a drive wheel assembly and rigid castors for directional control of the cart. In one current design, two rigid castors are fixed to the frame and located approximately midway between the swivel castors on each side of the cart frame. The two pair of swivel castor axes and the rigid castor axis are generally parallel to each other. The steerable driving unit is attached to the cart frame, generally by way of a plate that is hinged and spring loaded from the cart frame to ensure that the steerable drive wheel maintains adequate traction with the support surface.

It is known in the art for an AGV to include a rotatable platform that is attached to the cart frame to which the load may be secured. The rotatable platform allows for the load to be rotated as desired and independently of the direction of travel of the AGV. This is particularly useful in a manufacturing assembly line where the load comprises a workpiece that is operated upon by a worker. It may be advantageous for the workpiece to rotate so that the worker is able to operate upon all sides of the workpiece while remaining in the approximately same position in relation to the AGV.

Various safety mechanisms are currently utilized to prevent an AGV from colliding with persons or other objects, or injuring a person or damage to an object if a collision occurs. Sonic or optical sensors may be utilized to detect an object within a predetermined distance in the AGV's path of travel and, if an object is sensed, the AGV halts movement. A mechanical bumper may also be used, in conjunction with or separate from the object detection sensors described above, to prevent injury resulting from a collision. The bumpers are commonly composed of a "soft" material, e.g., rubber, that will absorb the energy from a collision. Pressure sensors may be disposed on or within a bumper to detect a collision and halt the travel of the AGV.

Despite the presence of the individual components described above, their satisfactory combination has yet to be addressed in the art. A rotatable load that is larger than the AGV and asymmetrical, e.g., longer than it is wide, presents a number of operational difficulties with the known safety mechanisms described above.

SUMMARY OF THE INVENTION

In view of the above, a need exists for an AGV design that effectively combines the convenience of a rotatable load mounting platform with the safety and operational characteristics of object detection safety mechanisms. More particularly, a need exists for an AGV design that allows for adjusting the detection distance of the safety mechanism based on the rotated position of the load.

To meet these and other needs that will be apparent to those skilled in the art based upon this description and the appended drawings, the present invention is directed to a vehicle having a drive frame for propelling the vehicle in response to a drive control signal. The drive frame is connected with a rotatable load platform. A controller is operatively coupled to the drive frame and generates the drive control signal. An object detector is operatively coupled to the controller and communicates with the controller when it senses an object within a predetermined distance of the vehicle.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 6 is an overhead view of a plurality of AGV's according to the present invention.

DETAILED DESCRIPTION OF THE PREFERRED EMBODIMENT

Figure 1:
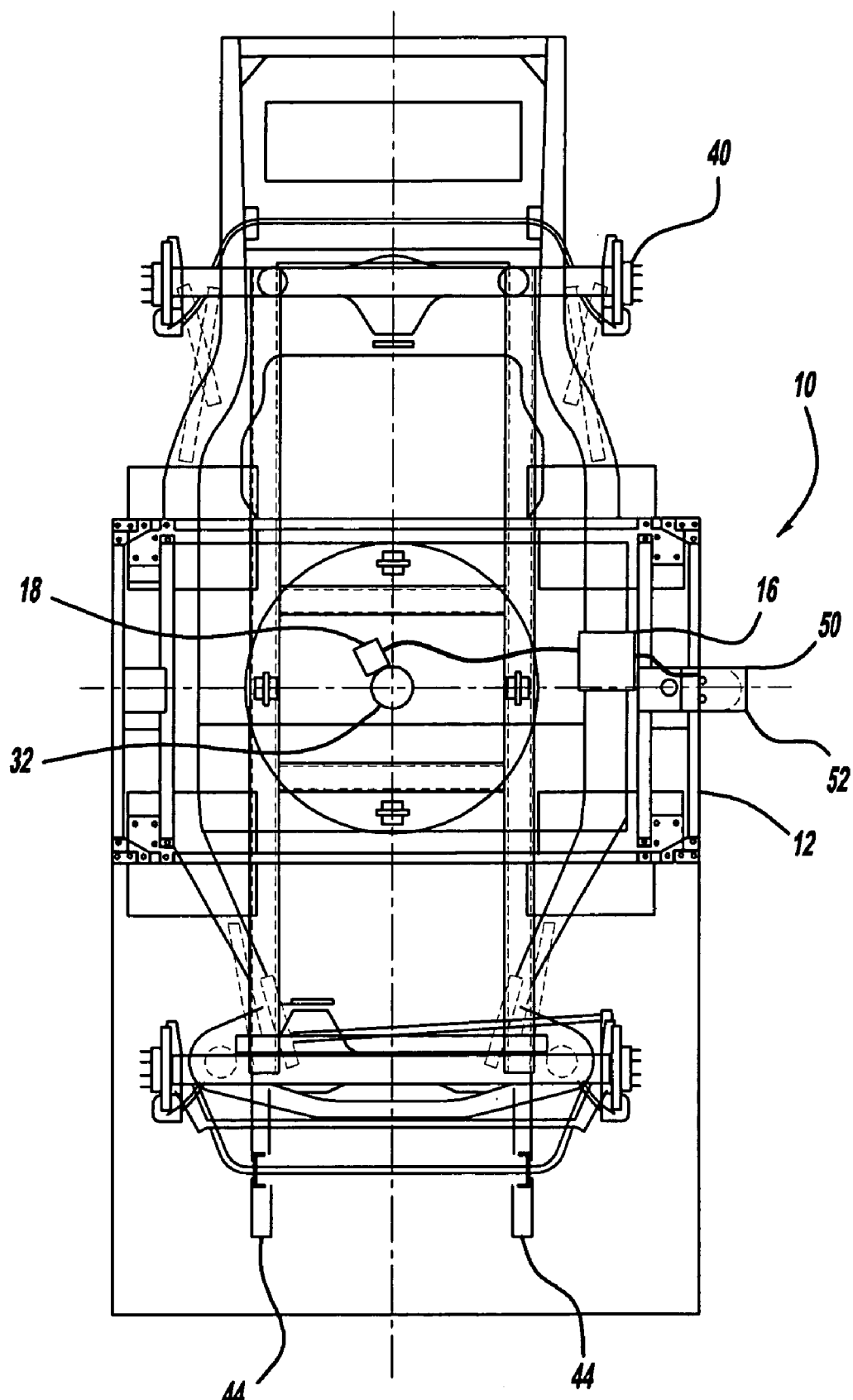
FIG. 1 is an overhead perspective view of an AGV with a load in a perpendicular position according to the present invention.

An automated guided vehicle 10 according to the present invention is illustrated and described with reference to FIGS. 1-6. It should be appreciated that the applications for the rotatable load with safety bumper according to the present invention may be used in a variety of applications beyond the illustrated AGV. For example, the present invention may be used with automated guided vehicles of a variety of configurations as well as other material handling vehicles, including but not limited to overhead material handling vehicles. The term vehicle as used herein is meant to be inclusive of all types of material handling apparatuses, and is not limited to an AGV as is described below in relation to a preferred embodiment.

The AGV 10 includes a drive frame 12 supported at each of its corners by swivel castors 14. The drive frame 12 includes a drive wheel 20, and a pair of rigid castors 22. The drive wheel 20 and rigid castors 22 are each fixed for movement with the drive frame 12. As is conventionally known, the drive wheel 20 is rotatable about a drive axis and a steering axis. Each of the rigid castors 22 are rotatable only about a single axis oriented perpendicular to the AGV's longitudinal axis. Accordingly, when the rigid castors are engaged with the cart support surface, the castors tend to maintain the directional control of the cart in its axial direction.

Figure 3:
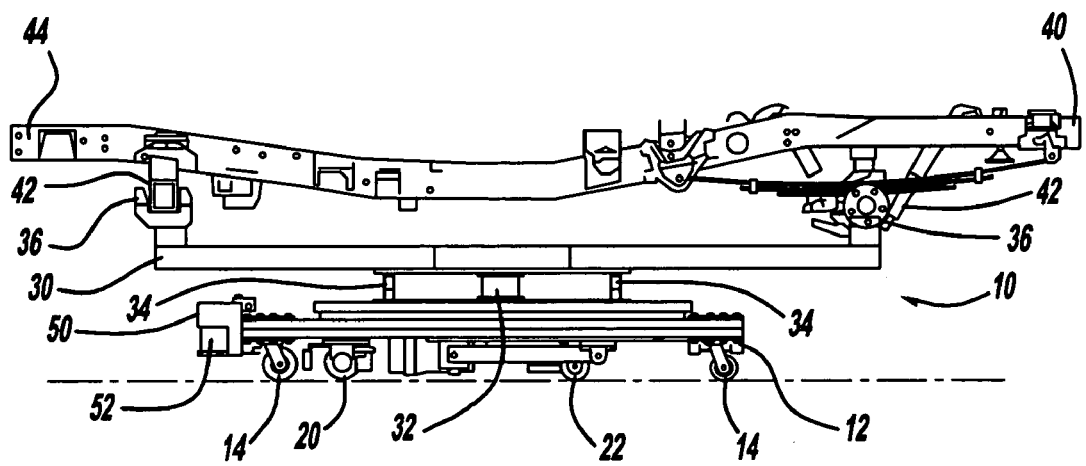
FIG. 3 is a side view of an AGV with a load in an aligned position according to the present invention.
Figure 4:
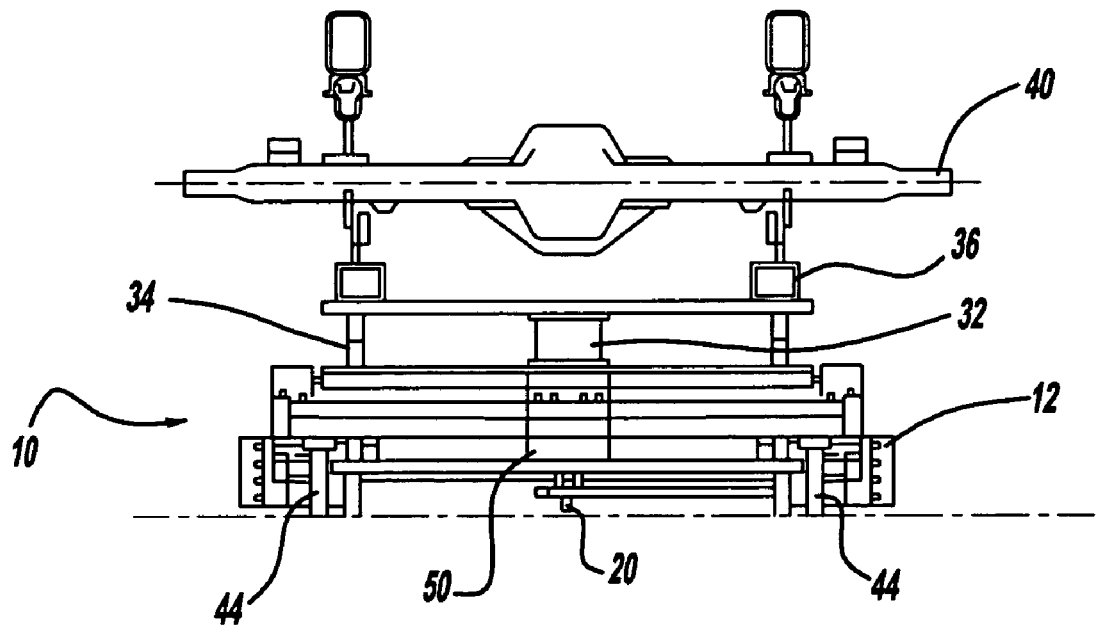
FIG. 4 is a heads-on view perspective view of an AGV with a load in an aligned position according to the present invention.

A load platform 30 is secured to the drive frame 12 by means of a swivel mechanism 32. The load platform 30 is specially designed in order to receive and secure the load 40. In FIG. 3, a load platform 30 with frame mounts 36 designed to receive an automobile frame as the load 40 is illustrated. The frame mounts 36 are arranged such that they mate with the load 40 at specified securing points 42. In this way, the load 40 is restricted from moving independently of the load platform 30. Various other means of securing the load 40 to the load platform 30, for example using lag bolts and nuts, are well known in the art and could be used.

Figure 5:
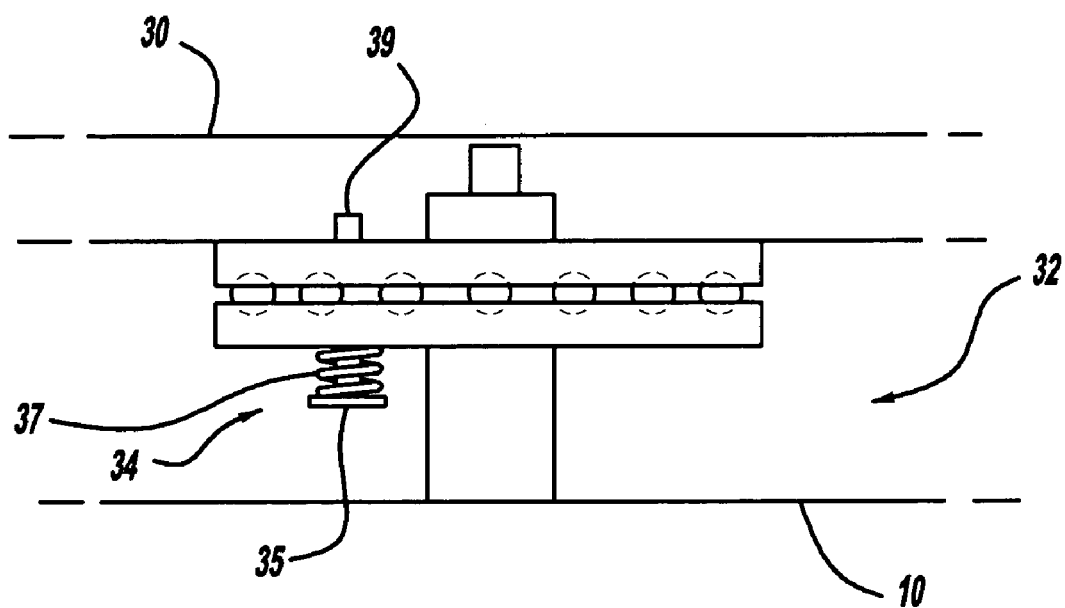
FIG. 5 is a side view of an AGV swivel mechanism according to the present invention.

The swivel mechanism 32, illustrated in FIG. 5, allows the load platform 30 to rotate in relation to the drive frame 12. The swivel mechanism 32 is preferably composed of a ball bearing swivel. The swivel mechanism 32 may have memory positions, which provide for specific rotated stop positions. These memory positions may comprise physical detents that provide positive stops or, in the case of automatic rotation of the swivel mechanism 32, electric memory stops, or both. In this way, the load 40 may be rotated to determined positions with high accuracy. Additionally, the swivel mechanism 32 preferably includes a locking mechanism 34 that, when engaged, locks the load 40 in any rotated position. The locking mechanism 34 may take the form of any of the well known locking mechanisms in the art, for example using locking gears, a magnetic stop, or the use of a cam-bar or a locking pin connected to one portion of the swivel mechanism 32 to engage a recess in the other portion of the swivel mechanism 32. In a preferred embodiment illustrated in FIG. 5, the locking mechanism 34 comprises a locking pin 35 coupled to the swivel mechanism 32 and including a spring 37. The spring 37 is arranged such that the locking pin 35 is biased to remain engaged with recess 39 in the locked position. In this embodiment, a force must be applied to the locking pin 35 to compress the spring 37 and disengage the locking mechanism 34. Alternatively, the force may be applied directly to the spring 37 itself. In either case, once this force is removed, the spring 37 expands and directs the locking pin 35 to engage the recess 39 in the locked position.

The swivel mechanism 32 preferably may be operated both manually and automatically. In manual operation, a worker first disengages the locking mechanism 34 and then applies a rotational force to the load platform 30. This rotational force may also be applied to the load 40, however the load 40 should be rigidly secured to the load platform 30 to prevent load disengagement and risk of injury. The worker then may rotate the load platform 30 to the desired position, and engage the locking mechanism 34 to prevent further rotation. The rotational force may also be generated by an electric motor or hydraulic system in response to a signal from the worker, e.g., by remote control.

In automatic operation, the load platform 30 will rotate as the AGV travels along its path. The rotational positions may be programmed into a controller 16 on the AGV. Alternatively, the controller 16 may receive rotation instructions as the AGV moves along its path of travel, as is known in the art. It should be appreciated that the controller 16 may be a microcontroller, a servo mechanism communicating with a remote controller, or any other means for controlling, including but not limited to a receiver in communication with the motor or motors used to propel the AGV 10, rotate the load platform 30, etc. Once the controller 16 determines that the load platform 30 should be rotated, the locking mechanism 34 is first disengaged in response to an instruction from a controller 16. The controller 16 then sends a signal to a rotation mechanism, preferably an electric motor, which generates a rotational force to be applied to the swivel mechanism 32. The magnitude, direction, and duration of this rotational force is determined by the controller 16 to ensure that the load platform 30 is rotated to the proper rotated position. Once the load platform 30 has reached the proper rotated position, the controller 16 then instructs the locking mechanism 34 to engage, thereby inhibiting further rotation.

The AGV further includes an object detection system 50. The object detection system 50 is designed to alter the travel of the AGV when an object is detected in the AGV's path of travel. In a preferred embodiment, the AGV stops when an object is detected. The object detection system 50 includes at least one sensor 52 and is in communication with the drive frame 12 through the controller 16. The sensor 52 is disposed on one end of the AGV, preferably the front end, and operates to detect physical objects within its range of detection in the path of travel of the AGV 10 when it is moving forward. Additional sensors 52 may be disposed on other ends of the AGV 10, to detect objects in the path of travel of the AGV 10 when it is moving in a direction other than forwards, for example, a sensor 52 disposed on the rear of the AGV 10 to detect objects when it is moving backwards. The sensor 52 preferably has variable sensitivity, so that its range of detection may be adjusted. The range of detection of the sensor is preferably adjusted automatically by the controller 16, based upon certain conditions. One of the conditions is the speed of the AGV. It is preferred to have a longer range of detection as the speed of the AGV increases. Additionally, the range of detection is preferably adjusted based on the rotated position of the load platform 30, as described below.

Figure 2:
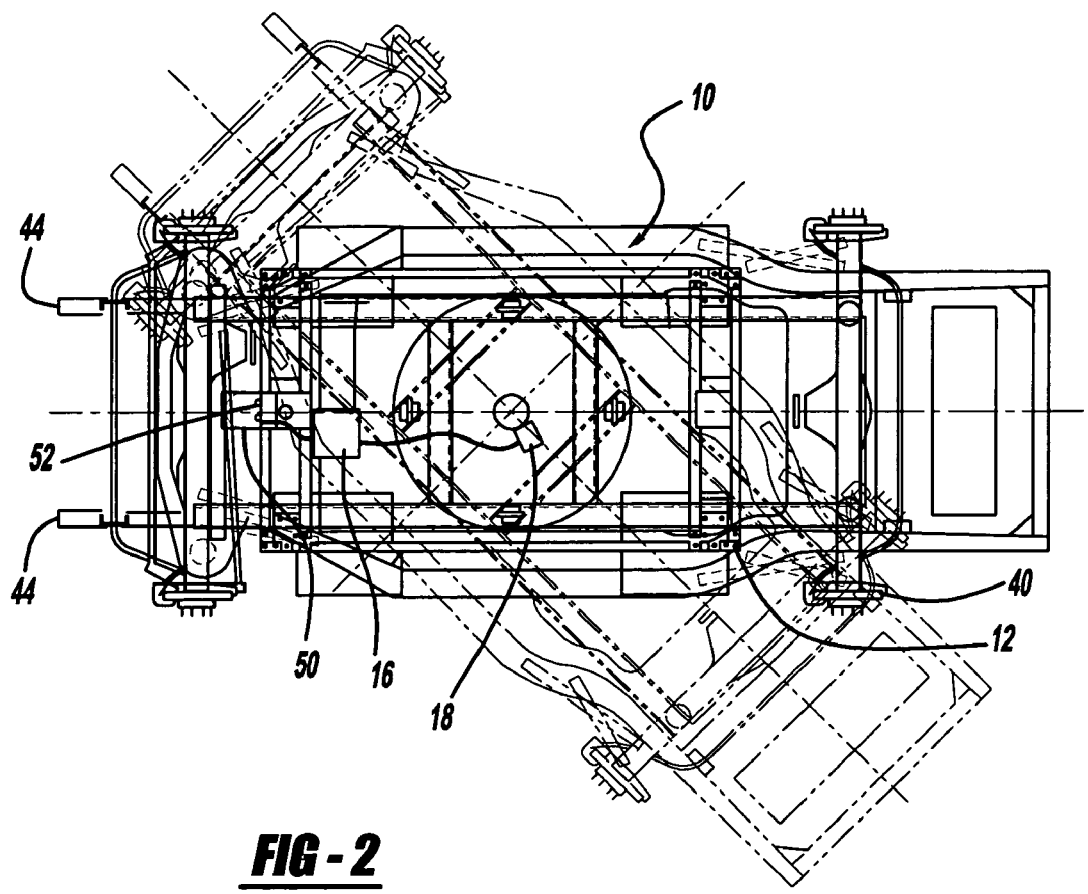
FIG. 2 is an overhead perspective view of an AGV with a load in an aligned position according to the present invention.

It may be advantageous to adjust the range of detection based upon the rotated position of the load 40. This is particularly true in the event that the load 40 is asymmetrical and larger than the AGV 10. An example of this situation is illustrated in FIGS. 1 and 2. In FIG. 1, a load 40 is shown that is rotated perpendicular to the drive frame 12. In FIG. 2, the load 40 is aligned to the drive frame 12 and, in the shadow lines, aligned at an angle to the drive frame 12. As is plainly shown, the front of the loaded AGV varies in distance from the object detection system 50 depending on the rotated position of the load 40. In FIG. 1, the frontmost portion of the loaded AGV 10 is the object detection system 50 itself. Therefore, the range of detection can be relatively short. In FIG. 2, however, the frontmost portion of the loaded AGV 10 is the front 44 of the load 40. Therefore, the range of detection should be relatively long in this instance.

In a preferred embodiment, the controller 16 is programmed to include predetermined ranges of detection for every given rotated position, for example, in a look up table. The controller 16 is in communication with a rotation sensor 18 that is capable of determining the rotated position of the load platform 30. Based on the rotated position provided by the rotation sensor 18, the controller 16 adjusts the range of detection of the sensor 52. One alternative embodiment of the invention includes a distance sensor in the object detection system 50, whereby the distance sensor determines the distance to the frontmost portion of the AGV, and the range of detection is adjusted based on this distance, preferably by adding to it a buffer distance. Another alternative embodiment includes eliminating the rotation sensor 18 and only allowing automatic rotation of the load platform 30. In this embodiment, the controller 16 may be preprogrammed with the ranges of detection for the planned rotated positions and, when the controller 16 instructs the rotation mechanism to move to each rotated position, the controller 16 adjusts the range of detection based on that preprogrammed for that rotated position.

In a preferred embodiment, the bank length 60 of the AGV 10 is also adjusted based on the rotated position of the load platform 30. As two AGV's move into proximity of each other in the direction of travel, it is desirable to control the distance between them such that they do not collide with each other. One method of controlling this distance is to choose a minimum distance, i.e., a bank length 60, to be maintained between AGV's at all times. If an AGV 10 senses another AGV at a distance equal to or less than its bank length 60, the controller 16 will instruct the drive train 12 to cease movement toward the other AGV.

In a preferred embodiment, illustrated in FIG. 6, the bank length 60 comprises the distance between the centerpoints of two AGV's. It is desirable to choose a bank length 60 that is as short as practical such that the amount of space occupied by a given number of AGV's is minimized. In order to accomplish this, the bank length 60 is variable based on the length of the load 40 in the direction of travel of the AGV 10. As described above, this length is dependent on the rotated position of the load platform 30.

FIG. 6 shows a plurality of AGV's 10a-d according to the present invention, each of which include an object detection system 50 and are traveling along the dotted path 70 in the direction of arrow 72. As stated above and illustrated in this figure, the bank length 60 for a given AGV 10 can be minimized as the length of the load 40 in the direction of travel of the AGV 10 decreases. Therefore, the bank length 60 for AGV's 10c and 10d can be chosen to be shorter than the bank length 60 for AGV's 10a and 10b. In FIG. 6, AGV's 10b and 10c will be precluded from moving in the direction of arrow 72 because of the position of AGV's 10c and 10d, respectively, while AGV's 10a and 10d are free to move in the direction of arrow 72.

The controller 16 may be programmed to include predetermined bank lengths for every given rotated position, for example, in a look up table. The controller 16 is in communication with a rotation sensor 18 that is capable of determining the rotated position of the load platform 30. Based on the rotated position provided by the rotation sensor 18, the controller 16 determines the appropriate bank length 60, which is then communicated to the drive frame 12. Similar to that described above in relation to the range of detection, another alternative embodiment includes eliminating the rotation sensor 18 and only allowing automatic rotation of the load platform 30. In this embodiment, the controller 16 may be preprogrammed with the bank lengths for the planned rotated positions and, when the controller 16 instructs the rotation mechanism to move to each rotated position, the controller 16 selects the bank length that was preprogrammed for that rotated position.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle comprising:
   a drive frame, said drive frame being capable of propelling said vehicle in response to at least one drive control signal;
   a load platform operatively coupled with said drive frame for carrying a load, wherein said load platform is capable of being rotated in relation to said drive frame;
   a controller, said controller operatively coupled to said drive frame and being capable of generating said at least one drive control signal;
   an object detector, said object detector being operatively coupled to said controller, wherein said object detector communicates with said controller when said object detector senses an object within a predetermined distance of said vehicle, wherein said predetermined distance is automatically adjusted based on a rotated position of said swivel; and
   a swivel disposed between said load platform to said drive frame.

2. The vehicle of claim 1 wherein said predetermined distance is adjustable.

3. The vehicle of claim 1 further comprising a rotation sensor operatively coupled to said load platform, said rotation sensor being capable of determining said rotated position of said load platform.

4. The vehicle of claim 3 wherein said rotation sensor communicates with said controller to permit said controller to cause said swivel to rotate said load platform in relation to said drive frame.

5. The vehicle of claim 1 wherein said swivel is a ball bearing swivel.

6. The vehicle of claim 1 wherein said load platform has at least one rotation memory position.

7. The vehicle of claim 1 further comprising a rotation locking mechanism operatively coupled to said load platform, wherein said rotation locking mechanism inhibits rotation of said load platform when engaged.

8. The vehicle of claim 1 wherein said load platform includes frame mounts to restrict movement of said load with respect to the load platform.

9. The vehicle of claim 1 wherein said drive frame includes a drive wheel and a rigid castor.

10. The vehicle of claim 1 wherein said controller communicates with a remote controller to cause said swivel to rotate said load platform in relation to said drive frame.

11. The vehicle of claim 1 wherein said swivel is driven by an electric motor.

12. The vehicle of claim 7 wherein said controller communicates with said rotation locking mechanism.

13. A vehicle comprising:
    a drive frame, said drive frame being capable of propelling said vehicle in response to at least one drive control signal;
    a load platform operatively coupled with said drive frame for carrying a load, wherein said load platform is capable of being rotated in relation to said drive frame;
    a controller, said controller operatively coupled to said drive frame and being capable of generating said at least one drive control signal;
    an object detector, said object detector being operatively coupled to said controller, wherein said object detector communicates with said controller when said object detector senses an object within a predetermined distance of said vehicle; and a swivel disposed between said load platform to said drive frame, wherein said object detector further comprises at least one distance sensor, said distance sensor being capable of determining a distance from said object detector to said load, whereby said predetermined distance is automatically adjusted based on said distance.

14. The vehicle of claim 13 wherein said predetermined distance is automatically adjusted based on a rotated position of said swivel.

15. The vehicle of claim 13 further comprising a rotation sensor operatively coupled to said load platform, said rotation sensor being capable of determining a rotated position of said load platform.

16. A vehicle comprising:

a drive frame, said drive frame being capable of propelling said vehicle in response to at least one drive control signal;

a load platform operatively coupled with said drive frame for carrying a load, wherein said load platform is capable of being rotated in relation to said drive frame;

a controller, said controller operatively coupled to said drive frame and being capable of generating said at least one drive control signal;

an object detector, said object detector being operatively coupled to said controller, wherein said object detector communicates with said controller when said object detector senses an object within a predetermined distance of said vehicle; and a swivel disposed between said load platform to said drive frame, wherein said controller communicates with said object detector and a rotated position of said swivel to determine a bank length.

17. The vehicle of claim 16 further comprising a rotation sensor operatively coupled to said load platform, said rotation sensor being capable of determining said rotated position.

18. The vehicle of claim 16 wherein said predetermined distance is automatically adjusted based on said rotated position of said swivel.

19. The vehicle of claim 16 wherein said load platform includes frame mounts to restrict movement of said load with respect to the load platform.

20. The vehicle of claim 16 wherein said drive frame includes a drive wheel and a rigid castor.

* * * * *